United States Patent Office 3,726,844
Patented Apr. 10, 1973

3,726,844
PROCESS FOR COPOLYMERIZING CONJUGATED DIENES WITH MONOVINYL AROMATIC MONOMERS
Adel F. Halasa, Bath, Ohio, assignor to The Firestone Tire & Rubber Company, Akron, Ohio
No Drawing. Continuation-in-part of application Ser. No. 693,763, Dec. 27, 1967. This application Nov. 20, 1970, Ser. No. 91,577
Int. Cl. C08f 19/08
U.S. Cl. 260—83.7                                              4 Claims

ABSTRACT OF THE DISCLOSURE

A diene of 4 to 6 carbon atoms and styrene or other vinyl aromatic monomer, including alkylated vinyl aromatic monomers, are copolymerized in a hydrocarbon solvent using a substantial amount of each monomer and utilizing as the initiator, an alkali metal hydrocarbon (preferably n-butyllithium) complexed with another alkali metal. The complex may be formed by complexing hydrocarbon lithium with a different alkali metal. The complexing metal is used in an amount no more than the amount of alkali metal initially present in the initiator. Thus, if the initiator be prepared from hydrocarbon lithium, the ratio of (a) the amount of alkali metal other than lithium in the complexed initiator to (b) the amount of lithium in the complexed initiator, may be one part of the other alkali metal to 50 parts of lithium, and preferably 5 to 20 parts of lithium. The resulting copolymer is a copolymer of substantially constant composition (i.e. a copolymer containing no substantial block of vinyl monomer); and it has a low vinyl content. The diene may be butadiene, isoprene, piperylene or 2,3-dimethylbutadiene or a mixture thereof. The vinyl aromatic monomer may be styrene or an alkylated styrene or vinyl naphthylene or alkylated vinyl naphthylene or a mixture thereof.

This application is a continuation-in-part of my application Ser. No. 693,763 filed Dec. 27, 1967, now abandoned.

This invention relates to an improvement in the copolymerization of a conjugated diene containing 4 to 6 carbon atoms with styrene or other hydrocarbon monovinyl aromatic monomer using a complex of a hydrocarbon derivative of an alkali metal (usually an alkyllithium such as n-butyllithium) complexed with a different alkali metal. The complexes and methods of complexing are claimed.

The copolymer obtained with the complex of this invention is useful as a replacement for butadiene-styrene, etc. copolymers prepared by other methods.

The complex is usually formed by heating a substantial amount of the complexing metal with the alkali metal hydrocarbon in the absence of air, and preferably in an inert hydrocarbon solvent, such as an aliphatic hydrocarbon solvent or benzene or toluene. A mixture of complexing metals may be used. The complex is formed by reacting a hydrocarbon lithium with sodium, potassium, cesium or rubidium. The complex can be recovered and stored or shipped if kept out of contact with air.

The conjugated diene may be butadiene-1,3, isoprene, piperylene or 2,3-dimethylbutadiene-1,3 or a mixture thereof.

The vinyl aromatic monomers which may be used include, for example, styrene, alpha-methyl styrene, vinyl toluene, vinyl naphthalene, 3,5-diethylstyrene, 2,4,6-trimethylstyrene, 2-ethyl-4-benzylstyrene, 4-p-tolylstyrene, 4-(4-phenyl-n-butyl)styrene, 4-methoxystyrene, 3,5-diphenoxystyrene, 3-decoxystyrene, 4-dimethylaminostyrene, 4,5-dimethyl-1-vinylnaphthalene, 3-ethyl-1-vinylnaphthalene, 2,4-diisopropyl-1-vinylnaphthalene, 3,6-di-p-tolyl-1-vinylnaphthalene, 6-cyclohexyl-1-vinylnaphthalene, 8-phenyl-1-vinylnaphthalene, 6-benzyl-2-vinylnaphthalene.

The copolymer obtained when copolymerizing with styrene using a lithium-based initiator, without complexing, contains terminal blocks of vinyl monomer. The copolymers produced by the process of this invention are produced so rapidly that they are of constant composition, i.e. they are substantially free of blocks of vinyl monomer. Also, they contain a low content of 1,2-diene units compared to the copolymers prepared with hydrocarbon lithium initiators. Furthermore, they contain substantially no gel.

The hydrocarbon lithium initiators that may be used are well known and include those hydrocarbon lithiums mentioned in British Pat. 817,693 which is included herein by reference as disclosing hydrocarbons useful as initiators as well as known methods of producing copolymers of butadiene or isoprene with styrene, etc., including known temperature ranges and known amounts of hydrocarbon-lithium initiator. Less of the complexing metal than lithium in the alkyl or other hydrocarbon lithium, will usually be employed, the amount of the hydrocarbon lithium being 1 to 50 and preferably 5 to 20 equivalent weights per 1 equivalent weight of the complexing metal. The complexing is carried out at a temperature between about room temperature and 100° C., and preferably at about 40 to 60° C. About 0.25 to 1 mmole of the complex is used for the polymerization of 1 mole of monomer.

The polymerization may be carried out in a hydrocarbon solvent at any temperature customarily used for such polymerizations, usually just below the boiling point of the solvent, but other temperatures may be employed usually between about 50 and 130° C. Atmospheric pressure will generally be employed, but pressures above or below atmospheric may be used.

The invention is illustrated by the following examples.

EXAMPLE 1

The initiator complex is advantageously prepared by heating 1 molar equivalent of the complexing metal with 5 to 10 molar equivalents of lithium in a hydrocarbon lithium. It should be understood that the amount of the complexing compound is used in excess of that which enters into the reaction. The complexing is advantageously done in an inert solvent. The following is illustrative:

To a 400-ml. solution of n-butyllithium (0.30 mmole per ml.) containing 120 mmole of n-butyllithium there was added 100 mmoles of potassium metal. The flask was then shaken vigorously for several hours at 50° C. The potassium complexed with the lithium in the n-butyllithium. The solution turned deep wine red. This contained substantially equi-molar parts of lithium and potassium. There was undissolved and unreacted potassium metal in the bottom of the solution. It is not necessary to separate this, but usually the solution of the complexed initiator will be decanted from such a residue. The complexed initiator may be separated from the solvent if it is to be stored or shipped. Such recovery will be attended with the precautions taken in volatilizing solvent from sodium or other alkali metal or compounds thereof which are explosive or highly inflammatory when exposed to the air.

Complexing sodium with n-butyllithium by a similar procedure produced a solution of a somewhat less intense red color.

EXAMPLE 2

A solution of the potassium-complexed initiator prepared according to Example 1 was separated and used. A solution of n-butyllithium (BuLi) was similarly complexed in the presence of an equi-molar amount of sodium and this complex was also used as another initiator. Butadiene-1,3 and styrene were copolymerized at 50° C.

for 6 hours in hexane, using these initiators with the following results:

TABLE I

| Run | Initiator complex | | | Properties of product | | |
|---|---|---|---|---|---|---|
| | BuLi, mmoles | K, mmoles | Na, mmoles | Styrene, percent | DSV[1] | Vinyl,[2] percent |
| 1 | 0.50 | 0.013 | None | 16 | 1.06 | 9.3 |
| 2 | 0.80 | None | None | 17 | 0.82 | 8.4 |
| 3 | 0.65 | 0.019 | None | 17 | 0.81 | 11.4 |
| 4 | 0.60 | 0.026 | None | 17.5 | 0.80 | 12.3 |
| 5 | 0.75 | 0.03 | None | 15.4 | 0.68 | 12.0 |
| 6 | 0.77 | 0.15 | None | 22 | 0.95 | 25 |
| 7 | 0.77 | 0.15 | None | 22 | 0.95 | 20 |
| 8 | 0.77 | 0.15 | None | 22 | 0.95 | 25 |
| 9 | 0.65 | 0.006 | None | 16.8 | | 9.3 |
| 10 | 0.60 | None | 0.07 | 16.0 | 0.95 | 9.6 |
| 11 | 1.00 | None | 0.11 | 16.5 | 0.73 | 10.6 |
| 12 | 1.30 | 0.013 | None | 19.7 | 0.54 | 10.1 |
| 13 | 0.60 | 0.026 | None | 18.5 | 0.76 | 12.8 |
| 14 | 0.90 | 0.039 | None | 18.0 | 0.60 | 12.6 |
| 15 | 1.20 | 0.039 | None | 16.6 | 0.91 | 10.3 |
| 16 | 1.50 | 0.065 | None | 16.8 | 0.82 | 10.6 |

[1] Dilute solution viscosity. ASTM-D 1601-61. Part 27, June 1967, page 531.
[2] Content of 1,2-structure.

Referring to the various runs, an excess of sodium or potassium was added to the n-butyllithium. The excess over that consumed in the complexing, collected in the bottom of the vessel, as explained in the detailed description of the example. Such a mixture of the excess metal and complexed initiator was used in all of the recorded runs. In other runs the excess metal was removed and it was found that its presence had no affect on obtaining a constant composition copolymer; however, it affected the molecular weight of the product (as evidenced by the low DSV). It is noted that in Runs 6 to 8 in which a large amount of potassium was used the amount of 1,2-structure in the copolymer was large. No gel was found in any of the products.

EXAMPLE 3

Table II shows the effect of the concentration of potassium, in two different butadiene-styrene loadings, on the amount of block styrene in the copolymer. The copolymerizations were carried out at 50° C. In the run in which only n-butyllithium was used as the initiator, without any potassium, 9.8 percent of block styrene was detected in the copolymer by chemical-oxidation analysis. The runs using a higher percentage of potassium yield copolymers of no or low block styrene content.

TABLE II

| Mmoles butyllithium | Percent styrene found | Mmoles potassium | DSV | Gel | Percent | | | |
|---|---|---|---|---|---|---|---|---|
| | | | | | Cis-1,4 | Trans-1,4 | 1,2 | Blocks |
| Styrene 15%, butadiene 85% | | | | | | | | |
| .65 | 13.5 | .0065 | .87 | 0 | 36.7 | 53.7 | 9.7 | 4.7 |
| .80 | 17.2 | .013 | .80 | 0 | 33.1 | 53.6 | 10.4 | 2.04 |
| .70 | 16.9 | .0195 | .81 | 0 | 33.0 | 55.5 | 11.4 | 1.23 |
| .60 | 17.5 | .026 | .80 | 0 | 32.2 | 55.5 | 12.3 | 0.59 |
| .75 | 15.4 | .0325 | .68 | 0 | 36.0 | 52.0 | 12.0 | 0.69 |
| .78 | 15.4 | .0324 | .79 | 0 | 37.7 | 53.8 | 8.5 | 6.4 |
| .70 | 16.4 | .03 | .88 | 0 | 27.9 | 51.7 | 20.4 | None |
| Styrene 30%, butadiene 70% | | | | | | | | |
| .80 | 17.5 | 0.013 | 1.06 | 0 | 44.2 | 48.4 | 7.3 | 0.73 |
| .50 | 17.4 | 0.013 | 1.06 | 0 | 33.7 | 55.1 | 11.2 | 0.73 |
| 1.3 | 16.4 | 0.013 | 0.54 | 0 | 35.2 | 54.7 | 10.1 | 1.97 |
| .60 | 19.7 | 0.026 | 0.67 | 0 | 28.1 | 59.1 | 12.8 | <½ |
| .90 | 18.2 | 0.039 | 0.60 | 0 | 33.9 | 53.4 | 12.6 | (1) |
| .65 | 18.0 | 0.006 | 0.86 | 0 | 35.6 | 54.9 | 9.5 | 4.22 |
| .57 | 16.8 | 0.003 | 1.07 | 0 | 33.2 | 57.5 | 9.3 | 5.75 |
| 1.2 | 15.3 | 0.39 | 0.57 | 0 | 54.2 | 37.1 | 8.8 | <½ |
| 1.2 | 15.8 | 0.039 | 0.91 | 0 | 33.6 | 54.1 | 12.4 | <½ |
| .80 | 16.6 | None | 0.82 | 0 | 38.4 | 51.5 | 10.1 | 9.8 |
| 1.5 | 18.5 | 0.65 | 0.82 | 0 | 35.0 | 52.3 | 12.7 | <½ |
| .60 | 17.0 | 0.26 | 0.63 | 0 | 35.5 | 52.5 | 12.8 | None |
| .90 | 16.8 | 0.39 | 0.64 | 0 | 35.4 | 54.2 | 12.3 | None |

[1] Trace.

EXAMPLE 4

Table III shows that the use of increasing amounts of sodium, decreases the amount of block styrene in the copolymer, and the amount of 1,2-addition product increases. The polymerizations were carried out at 50° C.

TABLE III

| n-Butyllithium, mmoles | Percent styrene found | Sodium, mmoles | DSV | Gel | Percent | | | |
|---|---|---|---|---|---|---|---|---|
| | | | | | Cis-1,4 | Trans-1,4 | 1,2 | Blocks |
| 0.70 | 16.8 | 0.0047 | 0.80 | 0 | 32.2 | 59.1 | 8.7 | 6.11 |
| 0.601 | 18.5 | 0.0117 | 0.86 | 0 | 33.4 | 57.7 | 8.8 | 5.93 |
| 0.702 | 15.7 | 0.0235 | 1.00 | 0 | 34.4 | 56.4 | 9.2 | 5.08 |
| 0.803 | 18.2 | 0.03425 | 0.75 | 0 | 33.1 | 57.5 | 9.4 | 5.00 |
| 0.904 | 17.9 | 0.047 | 0.82 | 0 | 31.3 | 58.8 | 9.9 | 4.75 |
| 0.606 | 16.0 | 0.0705 | 0.95 | 0 | 33.7 | 54.9 | 11.4 | 2.03 |
| 0.808 | 19.7 | 0.094 | 0.73 | 0 | 32.0 | 57.3 | 10.7 | 3.53 |
| 1.01 | 16.5 | 0.117 | 0.73 | 0 | 32.0 | 57.4 | 10.6 | 3.27 |
| 1.03 | 19.30 | None | 0.75 | 0 | 35.1 | 55.3 | 8.6 | 8.01 |

EXAMPLE 5

On completion of complexing reactions such as described in Example 1, on analysis of the supernatant liquid by flame photometry, it was discovered that the solution contained potassium complexed with the n-butyllithium, as recorded in Table IV.

TABLE IV

| | Potassium | |
|---|---|---|
| Charged, g./ml. | Found, g./ml. | Percent potassium |
| 0.0003 | 0.00040 | 4.0 |
| 0.0006 | 0.00045 | 4.0 |
| 0.00090 | 0.00070 | 7.0 |
| 0.0018 | 0.00095 | 9.0 |
| 0.003 | 0.0010 | 10.0 |
| 0.0003 | 0.00045 | 4.0 |

The complex may contain any amount of potassium complexed with n-butyllithium. A preferred range of alkali metal in complexes with n-butyllithium or other lithium hydrocarbon is 1 molar equivalent of sodium or potassium or other alkali metal beside lithium, with 5 to 10 molar equivalents of the n-butyllithium. The polymerizations were carried out at 50° C.

I claim:

1. The process of polymerizing a conjugated diene containing 4 to 6 carbon atoms and a hydrocarbon monovinyl aromatic monomer which comprises polymerizing said monomers at 50 to 130° C. in an inert hydrocarbon solvent and in the absence of air, and in the presence of an initiator which is an alkyllithium complexed with a different alkali metal selected from the group consisting of sodium and potassium prepared by heating 1 molecular equivalent of the latter with 1 to 50 molecular equivalents of the former at room temperature to 100° C., the complexing metal being present in sufficient amount to accelerate the polymerization and prevent the formation of any substantial amount of blocks of vinyl monomers, 0.25 to 1.0 millimole of the complex being used for each mole of monomer.

2. The process of claim 1 in which the monomers are butadiene-1,3 and styrene.

3. The process of claim 1 in which the initiator is n-butyllithium complexed with sodium.

4. The process of claim 1 in which the initiator is n-butyllithium complexed with potassium.

References Cited

UNITED STATES PATENTS

| | | | |
|---|---|---|---|
| 3,049,528 | 8/1962 | Diem | 260—94.2 |
| 3,091,606 | 5/1963 | Hsieh | 260—94.2 |
| 3,278,634 | 10/1966 | Magerlein et al. | 260—665 |
| 3,294,768 | 12/1966 | Wofford | 260—83.7 |

JAMES A. SEIDLECK, Primary Examiner

U.S. Cl. X.R.

260—62, 94.2 T, 665 R; 252—431 R